Patented Aug. 3, 1937

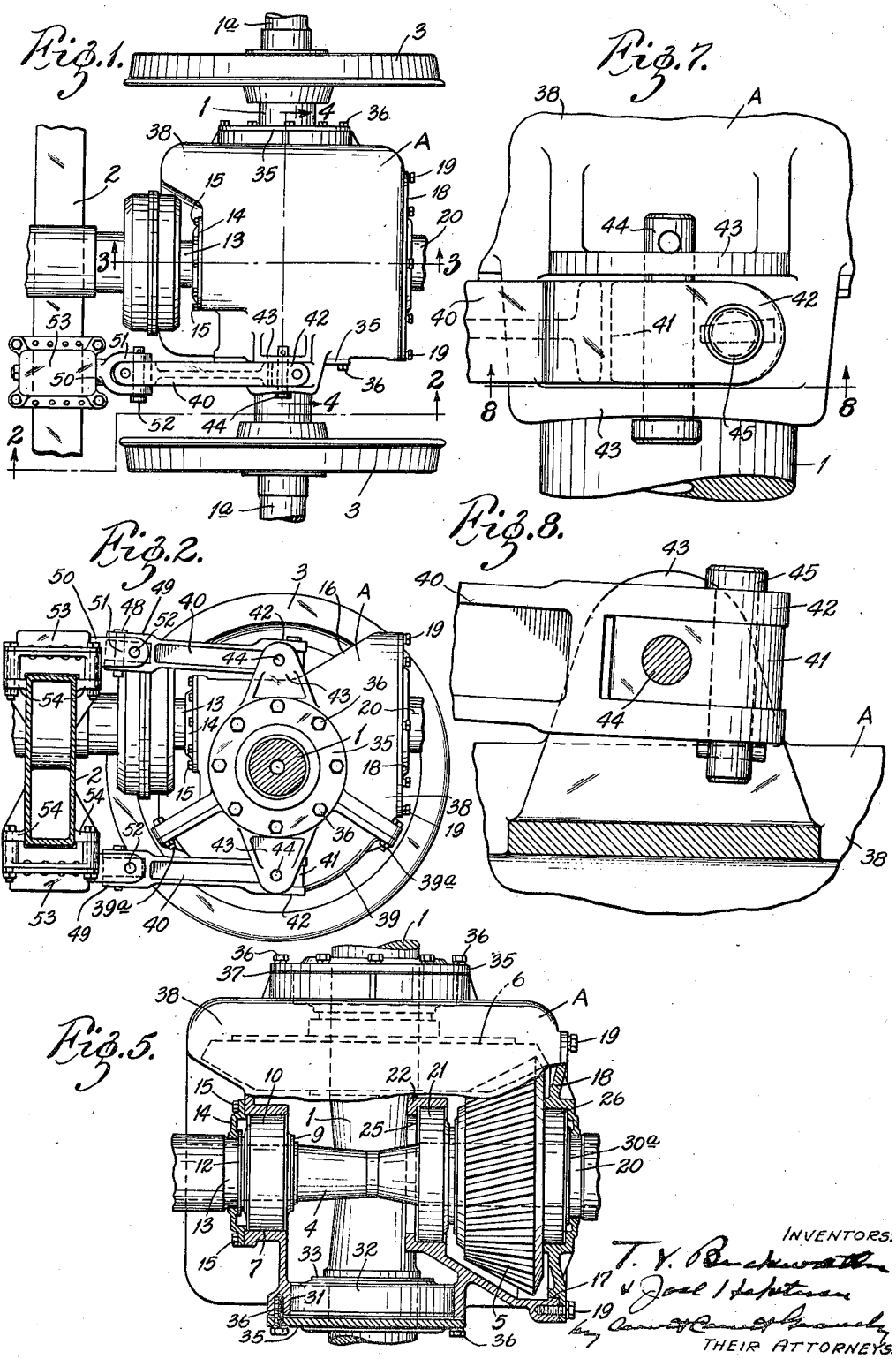
Aug. 3, 1937.    T. V. BUCKWALTER ET AL    2,089,016
DRIVING AXLE CONSTRUCTION
Filed Dec. 1, 1933    3 Sheets-Sheet 1

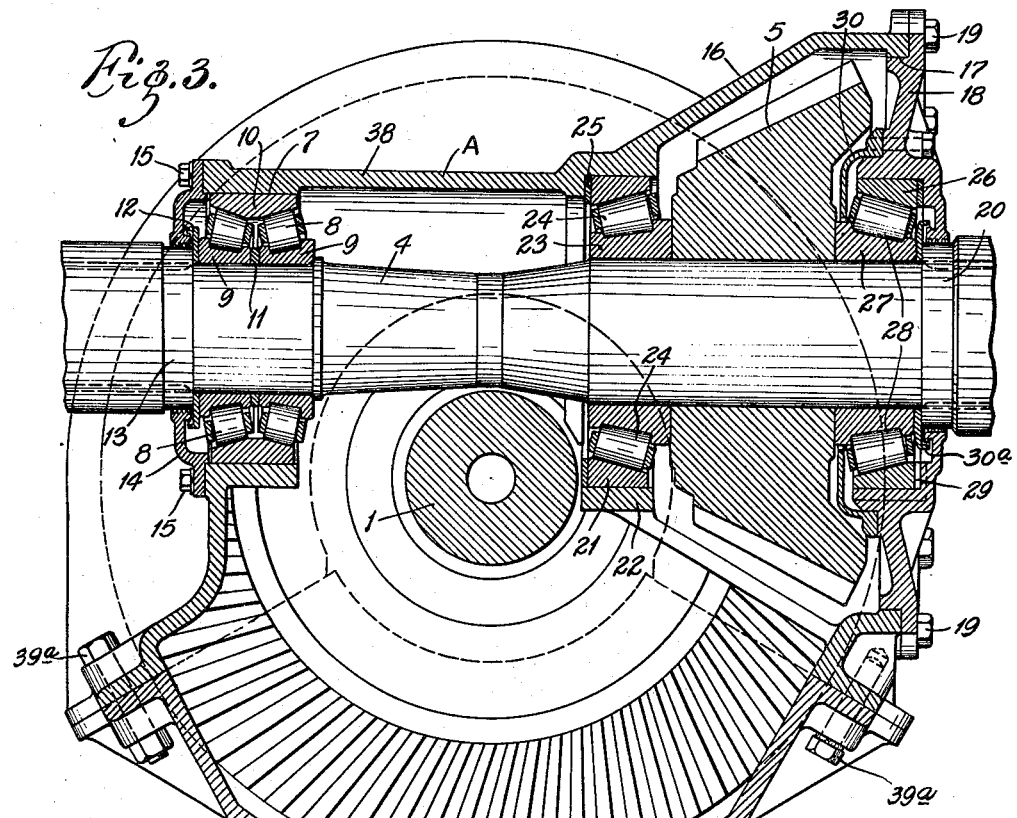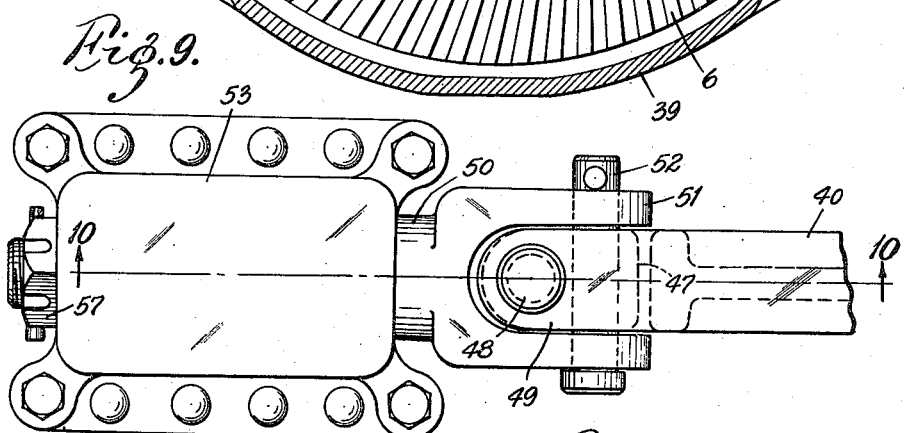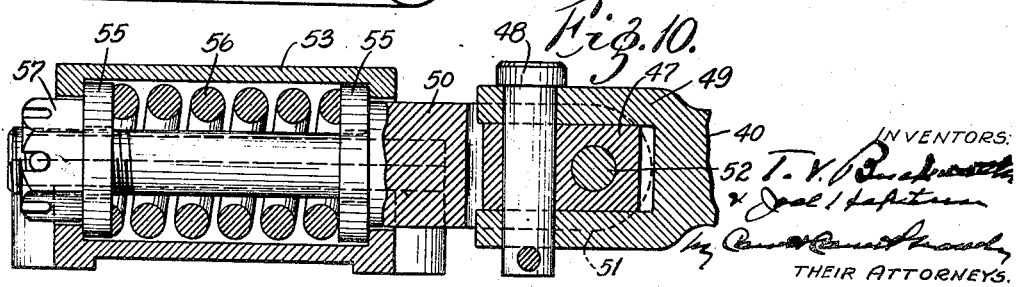

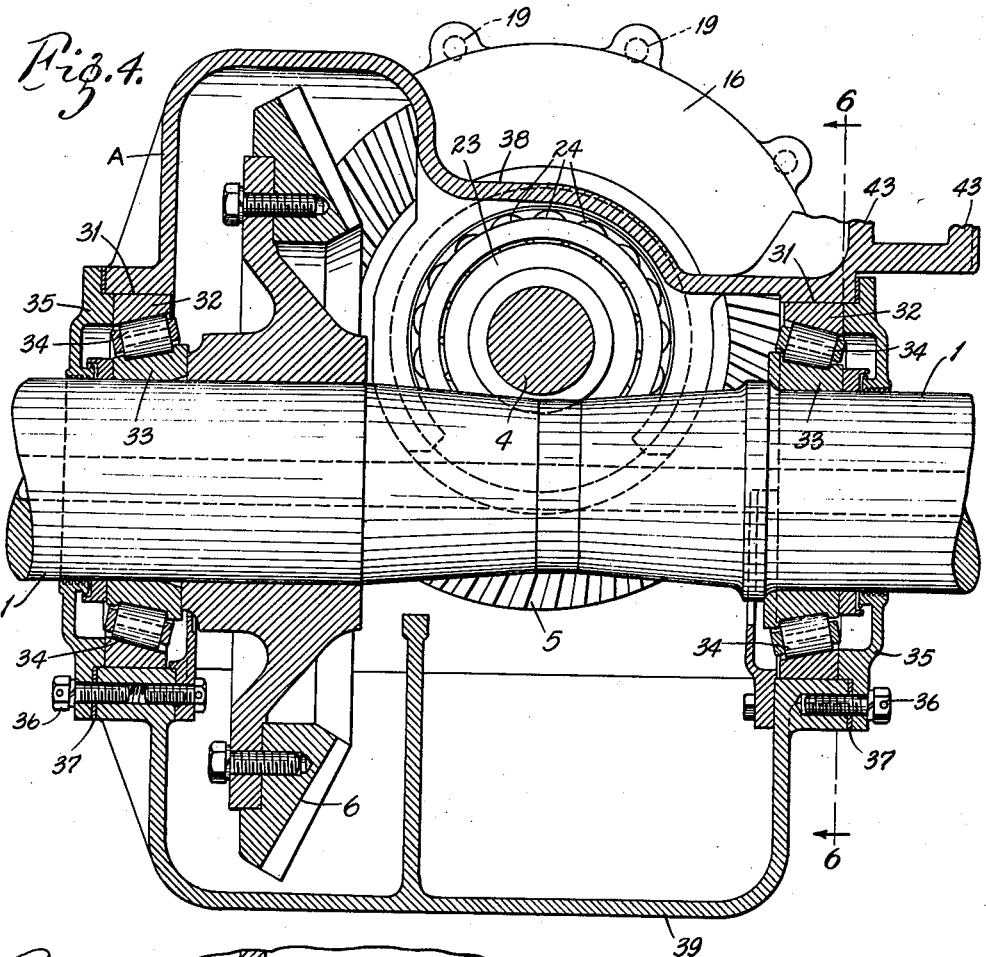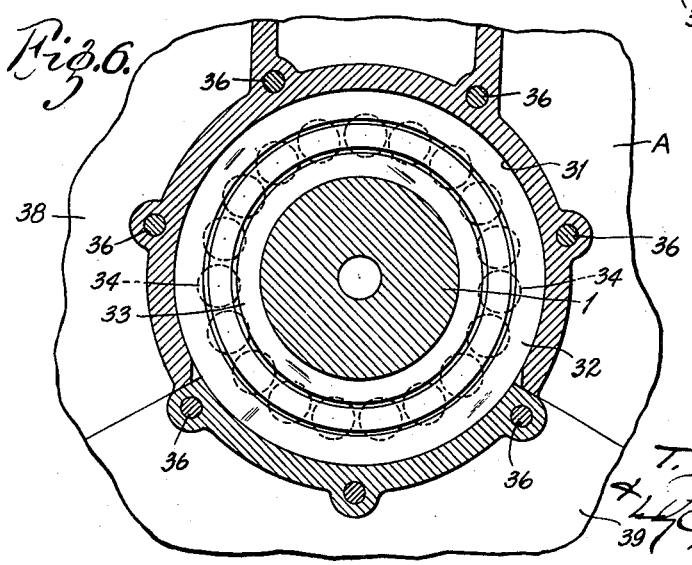

2,089,016

UNITED STATES PATENT OFFICE 2,089,016

DRIVING AXLE CONSTRUCTION

Tracy V. Buckwalter and Joel Hektner, Canton, Ohio, assignors to The Timken Roller Bearing Company, Canton, Ohio, a corporation of Ohio Application December 1, 1933, Serial No. 700,464

2 Claims. (Cl. 74—423)

This invention relates to driving axle constructions of self-propelled vehicles, particularly geared locomotives. It has for its principal objects to provide an enclosed drive gear unit for the axle that will permit the drive shaft, the pinion thereon and the bearings therefor to be mounted on and dismounted from the axle as a unit, facilitate inspection of the parts, resist torque reactions imposed on the unit and provide for simplicity and cheapness of construction and compactness of design. The invention consists in the driving axle construction, and in the combinations and arrangements of parts hereinafter described and claimed.

In the accompanying drawings, which form part of this specification, and wherein like symbols refer to like parts wherever they occur, Fig. 1 is a plan view of a driving axle construction embodying our invention, Fig. 2 is a vertical cross-section through the axle, showing the driving gear unit in end elevation, Fig. 3 is a vertical section through the driving gear unit, the section being taken longitudinally of the drive shaft on the line 3—3 in Fig. 1, Fig. 4 is a vertical section through the driving gear unit, the section being taken longitudinally of the axle on the line 4—4 in Fig. 1, Fig. 5 is a part plan and part horizontal sectional view of said unit, Fig. 6 is a vertical cross-section on the line 6—6 in Fig. 4, Fig. 7 is a fragmentary plan view showing the connection between one of the torque rods and the casing of the gear unit, Fig. 8 is a vertical section on the line 8—8 in Fig. 7, Fig. 9 is a fragmentary plan view illustrating the connection between the torque rod and the truck bolster; and Fig. 10 is a vertical longitudinal section on the line 10—10 in Fig. 9.

Referring to the accompanying drawings, our driving gear unit is shown in connection with one of the driving axles 1 of a locomotive truck, of which only the cross-frame member or bolster 2 is shown. Said axle is provided near its ends with wheels 3 and beyond said wheels with journals 1a adapted to cooperate with suitable journal boxes (not shown). Said drive gear unit is mounted on the axle 1 intermediate the wheels 3 thereof and comprises a sectional housing or casing A within which is enclosed the entire driving mechanism for said axle. Said driving mechanism comprises a main drive shaft 4 that is disposed transversely of and offset vertically from the axle 1 and is operatively connected to said axle by gearing, preferably skew or hypoid bevel gearing, comprising a drive gear or pinion 5 press-fitted on said drive shaft and intermeshing with a large driven gear press-fitted on said axle.

The drive shaft 4 is preferably located above the axle 1 and extends through the housing A with one end journaled in a double taper roller bearing mounted in an opening 7 provided therefor in the adjacent side wall of said housing. Said double taper roller bearing comprises two series of conical bearing rollers 8, a conical inner raceway member 9 for each series of rollers and a doubly coned cup or outer raceway member 10 for both series of rollers that has a loose fit in the opening 7 provided therefor in the housing A. The two cones 9 are press-fitted on the drive shaft 4 with the inner cone disposed in abutting relation to a shoulder provided therefor on said shaft, with a spacing ring 11 interposed between the adjacent ends of said cones and with a suitable oil seal or baffle plate 12 interposed between the outer end of the outer cone and the inner end of the hub 13 of a suitable universal joint member. The outer end of the bearing receiving opening 7 is closed by means of an annular closure plate 14, which snugly fits the hub 13 of the universal joint and is removably secured to the housing by means of cap screws 15.

The bevel pinion 5 is located near the opposite end of the drive shaft; and the portion of the housing A adjacent to said opening is enlarged, as at 16, to accommodate said pinion. The housing is provided in the wall opposite the wall containing the bearing receiving opening 7 with an opening 17 through which the drive shaft, the bearings therefor and the pinion thereon may be inserted in and removed from said housing. The opening 17 is closed by an annular closure plate 18 that is removably secured to said housing by means of cap screws 19. The annular closure plate 18 snugly fits the hub 20 of a suitable universal joint member similar to the universal member 13 at the opposite end of the drive shaft.

The drive shaft 4 is supported in the housing A at the opposite ends of the bevel pinion 5 thereon by means of taper roller bearings which serve to take care of radial and end thrust loads on said shaft. The innermost bearing comprises a conical cup or outer bearing member 21 seated in an opening provided therefor in a bracket 22 that depends from the housing adjacent to the inner end of the pinion 5, a cone or inner bearing member 23 press-fitted on the shaft 4 in abutting relation to said pinion and conical bearing rollers 24 interposed between said cup and said cone. The bearing is adjusted by means of an annular plate or washer 25 interposed between the large end of the cup 21 and an annular shoulder on the bearing supporting bracket 22.

The bearing at the outer end of the pinion 5 comprises a conical cup or outer bearing member 26 seated in an annular recess provided therefor in the end closure member 18, a cone or inner bearing member 27 press-fitted on the drive shaft 4 in abutting relation to the outer end of said pinion and a series of conical bearing rollers 28 interposed between said cup and said cone. This bearing is adjusted by means of an annular plate or washer 29 interposed between the outer end of the bearing cup and a shoulder formed by the cup receiving recess in the closure member 18. An annular oil retaining plate 30 is secured to the inner face of the closure member in overlapping relation to the inner ends of the cup and bearing rollers; and an annular oil retaining plate or baffle 30a is sleeved on the shaft 4 between the cone and the hub 20 of the universal joint member.

Interposed between the axle 1 and the openings 31 provided therefor in the housing or casing A are antifriction bearings, preferably taper roller bearings. Each of said bearings comprises a conical cup or outer bearing member 32 removably mounted in the axle receiving opening 31, a cone or inner bearing member 33 press-fitted on the axle in abutting relation to the hub 6 of the large bevel gear 6 thereon and a series of conical bearing rollers 34 interposed between said cup and said cone. Each axle receiving opening 31 is closed by means of an annular closure plate 35 that is removably secured by cap screws 36 to the end wall of the housing. Each bearing is adjusted by means of a series of thin shims 37 interposed between the closure member 35 and the end of the housing. The closure member 35 snugly fits the axle and an annular oil seal or baffle plate 37 is mounted on said axle between the outer end of the bearing cone and the adjacent face of said closure member.

In order to permit assembly, disassembly and inspection of the parts, the housing A is made in two sections, an upper or main section 38 and a lower cap or cover section 39. The upper housing section 38 encloses and supports the drive shaft, its bearings and its bevel pinion, whereby all of these parts are removable from the axle with said upper housing section as a unit. The upper or main section 38 includes the greater portion of the entire housing A and is provided with an opening disposed entirely below the axle axis; and the lower section 39 constitutes a cap or cover for said opening. The main and the cover section have complementary arcuate seats in their end walls that together constitute the openings 31 for the cups 32 of the bearings that support the housing on the axle. The gaps between the ends of the arcuate seats of the main housing section 38 must be large enough to permit the housing supporting bearings without their cups 32 to pass therethrough. In the particular form illustrated, the abutting faces of the main and cover sections of the housing are provided with cooperating flanges that are secured together by bolts 39a; and said flanges extend along diverging radial lines, whereby the cover section has the form of a sector of said housing. By this arrangement, when it is desired to remove the upper housing section 38 from the axle, the sector-shaped lower cover section 39 is removed, the end closure members 35 for the housing supporting bearings are detached from the housing, and the cups 32 of said bearings are then removed from the openings 31, thereby permitting the upper section, together with the entire mechanism therein, to be lifted off the axle due to the gaps left in the lower portion of the bearing receiving openings 31 by the removal of the sector-shaped lower cap section 38 of said housing.

Torque reactions imposed on the housing are resisted by a pair of vertically spaced parallel torque rods 40 that connect one end of the housing A with the cross frame member or bolster 2 of the truck above and below the axle axis. The torque rods are connected by suitable universal joints with the axle housing and the truck bolster. The connection between each torque rod 40 and the housing A comprises a block 41 interposed between the vertically spaced branches of a yoke 42, which is formed in the adjacent end of said rod and is loosely interposed between a pair of vertically disposed horizontally spaced lugs 43 on said housing. The block 42 is pivotally secured to the lugs 43 for vertical swinging movement therebetween by means of a horizontal pin 44; and the torque rod is pivotally secured to said block for horizontal swinging movement by means of a pin 45 disposed at right angles to the pin 44. The connection between the other end of each torque rod 40 and the truck bolster 2 comprises a block 47 secured by means of an upright pin 48 between the vertically spaced branches of a yoke 49 formed on said end of said rod, and an extension of said rod in the form of a rod 50 provided with a yoke 51 whose horizontally spaced branches loosely straddle the yoke 49 and the block 47 and are secured to the latter by a horizontal pin 52. The torque rod extension 50 extends through a box 53 that is bolted or otherwise removably secured to laterally extending lugs 54 that project from the side of the bolster 2. Sleeved on the torque rod extension 50 between a pair of collars 55 sleeved thereon is a coil spring 56, the pressure of which may be regulated by means of a nut 57 on the end of said extension. The coil spring 56, together with the collars 55 at the opposite ends thereof, are enclosed within the box 53 with said collars bearing against shoulders provided therefor adjacent to the rod receiving openings at the opposite ends of said box. By the arrangement described, the rods operate to yieldably resist torque reactions imposed on the housing of the driving gear unit, the springs tending to absorb such reactions and cushion the shock. The pivotal connections between the torque rods and the bolster and housing permit limited relative movement of said housing and bolster in both horizontal and vertical directions; and said torque rods act after manner of parallel links to resist tilting of the housing during the vertical movement thereof.

The hereinbefore described driving gear unit has numerous advantages. It provides a housing for all of the driving mechanism; it permits the drive shaft, the drive pinion thereon and the bearings therefor to be quickly and easily removed from the axle without dismounting these parts from the housing; and it permits the drive shaft, the pinion, the double taper bearing and the cones and rollers of the two single bearings to be removed from the housing as a unit. The use of the hyperboloidal bevel gear driving connection between the drive shaft and the axle enables said shaft to clear said axle; and the torque rod connections between the housing and the truck frame operate to yieldably resist and cushion the torque reactions on the housing and, at the same time, permit limited vertical and horizontal movement of the housing with the axle. The placing of the torque rods above and below the axle serves to balance the forces in said rods and thus relieves the axle of bending stresses which cause objectionable pressure on the outboard journal or driving boxes. Such spacing of the torque rods also prevents endwise tilting of the drive shaft when relative vertical movement occurs between the frame and axle, thereby avoiding fluctuations in the rotative motion of said drive shaft. The cushion connections between the frame and the torque rods serve not only to absorb shock therebetween, but they also tend to equalize the distribution of the power between the drive shafts of a plurality of driving units.

Obviously, the hereinbefore described construction admits of considerable modification without departing from the invention. Therefore, we do not wish to be limited to the precise arrangement shown and described.

Reference is hereby made to our copending applications Serial No. 119,759 filed January 9, 1937 and Serial No. 119,760 filed January 9, 1937, for subject matter divided out of the present application.

What we claim is:

1. In a construction of the kind wherein a gear housing is mounted on an axle and has a drive shaft therein disposed crosswise of said axle and provided on one side of said axle with a pinion that intermeshes with a gear rotatable with said axle, single taper roller bearings located entirely on said side of said axle for supporting said drive shaft in said housing at opposite ends of said pinion and for resisting end thrust of said pinion in either direction, and a double taper roller bearing for supporting said drive shaft in said housing on the other side of said axle, said double taper roller bearing including a bearing cup loosely mounted in said housing for preventing end thrust from being transmitted to said housing by said bearing.

2. In a construction of the kind wherein a gear housing is mounted on an axle and has a drive shaft therein disposed crosswise of said axle and provided on one side of said axle with a pinion that intermeshes with a gear rotatable with said axle, single roller bearings for supporting said drive shaft in said housing at opposite ends of said pinion, and a double roller bearing for supporting said drive shaft in said housing on the other side of said axle, each of said roller bearings including an inner raceway member press-fitted on said drive shaft and said double roller bearing also including an outer raceway member having a floating fit in said housing, said housing having a seat therein for the innermost single roller bearing of larger diameter than the diameter of said outer raceway member of said double roller bearing and having an opening in the side thereof remote from said double roller bearing of a larger diameter than the diameter of said pinion, and a removable closure member for said last mentioned opening having a seat for the outermost single roller bearing, whereby said drive shaft, said pinion, the inner raceway members of said single roller bearings and the entire double roller bearing are adapted to be inserted in and removed from said housing as a unit through said opening upon removal of the closure member therefor.

TRACY V. BUCKWALTER.
JOEL HEKTNER.